July 8, 1941.   B. McCLELLAND   2,248,686
INTERNAL SIPHON FOR PRESSURE GAUGES
Filed Oct. 8, 1938
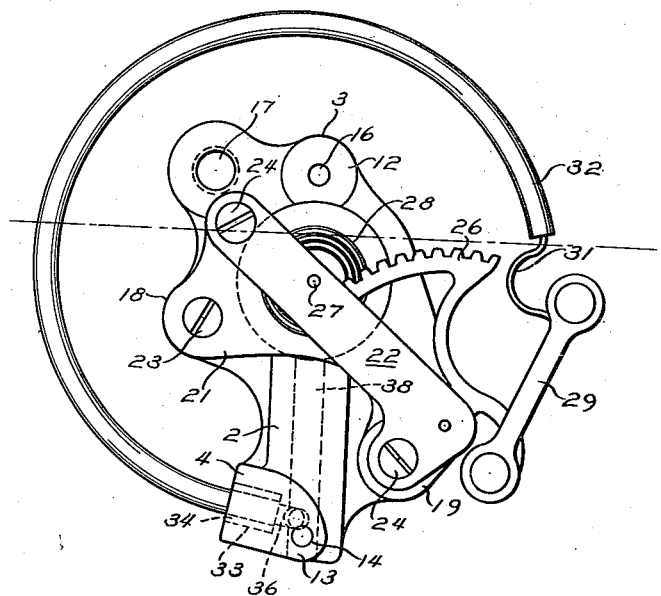
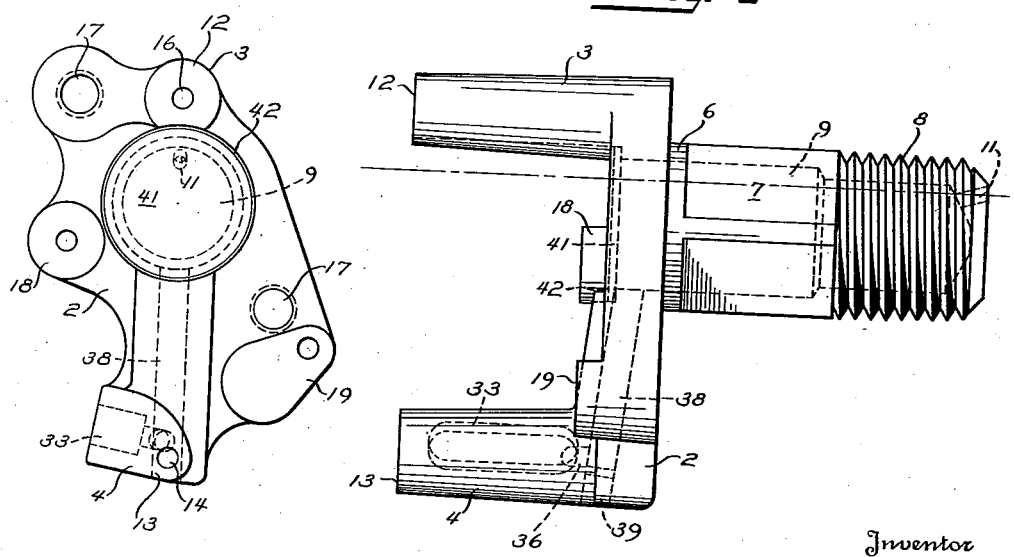
Inventor
Bert McClelland
By Strauch & Hoffman
Attorneys Patented July 8, 1941

2,248,686

UNITED STATES PATENT OFFICE 2,248,686

INTERNAL SIPHON FOR PRESSURE GAUGES

Bert McClelland, Perkasie, Pa., assignor to United States Gauge Company, Sellersville, Pa., a corporation of Pennsylvania Application October 8, 1938, Serial No. 234,032

6 Claims. (Cl. 73—109)

This invention relates to pressure gauges of the Bourdon type and more particularly to such gauges having internal traps or siphons.

When gauges of this kind are employed to measure the pressure of high temperature fluids, such as high pressure steam, the provision of some sort of a trap, or siphon, as it is sometimes called, has been resorted to in order to prevent direct contact of the high temperature fluid with the Bourdon spring element. The spring element being formed of thin metal its physical characteristics are, of course, affected by high temperatures and direct contact of the high temperature fluid therewith is, therefore, undesirable. Also, the spring elements are usually joined to their supporting members by soldered joints which should be protected from the high temperature fluid.

Accordingly, it has long been the practice to provide a trap means, somewhere in the line leading to the gauge, for collecting a body of condensed fluid of sufficient volume to entirely fill the spring element. This body of liquid transmits the pressure of the fluid, behind it, to the spring element while at the same time it protects the element from direct contact with the heated fluid.

Sometimes these traps consist merely of looped portions in a pipe leading to the gauge, i. e., the well known "pig-tail" siphon, but as this arrangement is somewhat objectionable from the standpoint of unsightliness, and also is exposed to damaging blows, it has also been proposed to arrange the trap entirely within the gauge casing. Several kinds of traps of the latter type have been suggested which include a separate section of tubing arranged within the casing and connected between the Bourdon tube and gauge inlet passage so as to form a trap. Also, specially formed post or socket members provided with cored-out chambers have been used for this purpose.

However, while internal traps of the kind just mentioned operate in a satisfactory manner, they involve either radical changes in the size and/or shape of post or socket members or the trap tubings occupy considerable space within the gauge casing. This is especially disadvantageous in certain types of gauges where the shape of the socket member cannot be conveniently modified and where practically all of the available space within the casing is required by the Bourdon spring and gauge movement. This is particularly true of gauges of the so-called "back-connected" type in which the post or socket is little more than a frame-work for supporting the gauge parts and wherein there is little extra space available within the casing for an extra trap tube.

It is, therefore, a primary object of this invention to provide an improved pressure gauge having an internal trap which does not occupy any of the space within the casing or alter the shape or size of the post or socket member.

More particularly it is an object of this invention to provide an improved internal trap or siphon which, while formed directly within a portion of the post or socket member, so as to not occupy any space within the gauge casing, is of ample capacity to insure its proper operation at all times.

A still further object of my invention is to provide an improved gauge of the "back-connected" type having an internal trap formed directly within a nipple portion of the post or socket member so as to not change the size or shape of the post member.

Another object of this invention is to provide an improved gauge construction wherein a trap chamber is arranged entirely within a nipple portion of the socket member and above the joint between the Bourdon spring and socket member.

A still further object of this invention is to provide an improved gauge construction having a large sized trap chamber together with means for facilitating the condensation of high temperature fluid therein.

It is also an object of this invention to provide an improved pressure gauge embodying an internal trap formed within the post or socket member which is simple in construction, inexpensive to make, and positive and efficient in operation.

The foregoing and other ancillary objects will become apparent from the following detailed description of a preferred embodiment of my invention when considered in connection with the appended claims and accompanying drawing, wherein:

Figure 1 is a front elevation of a gauge embodying my invention with the outer casing removed to show the interior construction thereof:

Figure 2 is a front view of the post or socket member of the gauge shown in Figure 1; and Figure 3 is a side elevation of the post or socket member shown in Figure 2.

Referring to Figures 2 and 3, the post or socket member comprises a main body 2 from which extend forwardly projecting portions 3 and 4. Extending rearwardly from body portion 2 is a cylindrical nipple 6 which is machined with flats, at 7, to provide for wrench connection and is threaded at its outer end at 8. Nipple portion 7 is drilled or cored-out to form a recess or chamber 9 and this recess extends through the front of body portion 2, as will be seen from an inspection of Figure 3. A drilled aperture 11 leads into the upper portion of recess 9 for a purpose to be later described.

The front faces of projecting portions 3 and 4 are provided with the machined flat surfaces 12 and 13, which lie in a common plane and provide means for attaching a dial or like element to the post or socket member, such element being attached by screws or rivets received in apertures 14 and 16, provided in the surfaces 12 and 13 aforementioned.

Threaded openings 17 are provided in the base or socket member as shown in Figure 2 for the purpose of securing the same to a gauge casing structure in the usual manner. Bosses 18 and 19 receive a movement plate 21, secured thereto by screws 23, which carries the gauge movement mechanism, including a front plate 22, held in spaced relation from plate 21 by spacing screws 24. A quadrant 26 is pivoted between plates 21 and 22 and meshes with a gear carried by shaft 27, the usual hair-spring 28 being provided to compensate for backlash in the parts. Quadrant 26 is connected by means of link 29 to a connecting member 31 carried by the extreme end of a Bourdon tube 32.

The opposite end of the Bourdon tube 32 is received in an elongated slot 33 provided in the forwardly projecting portion 4 (see Figures 2 and 3), the usual soldered connection 34 being provided at this point to provide a liquid-tight joint.

Leading rearwardly from the recess 33 is a duct 36 which connects with a drilled opening 38 extending upwardly into the front and lower portion of the recess 9. The lower end of passage 38 is plugged as shown at 39 (see Figure 3). A plate 41 is secured over the front of recess 9 in any convenient manner, as for example by staking or soldering, as shown at 42. If desired, plate 41 may be threaded into the body 2 or any other method of securing this plate in place may be employed so long as a liquid-tight joint is provided, strong enough to withstand gauge pressure.

The recess 9 can be formed in any convenient manner, but is preferably obtained by drilling out the nipple portion 6 on a conventional design post member of the so-called back-connected type. However, this recess 9 may obviously be formed by coring-out the nipple member in the initial casting process. In either event it will be observed that the recess 9 is of considerable capacity and also that it is located an appreciable distance above the lower end of the Bourdon tube 32. Furthermore, the recess is made as large as possible without weakening the nipple so that the nipple wall forming the recess is relatively thin.

When the gauge is connected to a steam line by the threaded portion 8, and with the gauge parts in their proper vertical position as shown in Figure 1, the steam enters through the relatively small aperture 11 and, due to the expansion thereof into the large chamber 9, is condensed. Condensation is also facilitated by cooling of the steam through the thin nipple wall. This condensate eventually fills chamber 9, ducts 38, 36 and the lower part of Bourdon tube 32 to a level determined by the height of the small-sized opening 11, see dot-dash lines Figures 1 and 2. The chamber 9 is preferably large enough to hold a volume of liquid sufficient to entirely fill that part of the Bourdon spring above the aforementioned level. Accordingly, when the steam pressure, acting upon the liquid, forces the same into the Bourdon tube, the liquid will entirely fill it, and yet, at the same time, all of the liquid will not have been displaced from the chamber 9. Therefore, it will be seen that the lower portion of Bourdon tube 32, especially around the soldered connection 34, will at all times be covered up by the condensed fluid. Also, the hot steam, or other high temperature fluid, the pressure of which is being measured, cannot come into direct contact with the Bourdon tube 32.

Thus I have provided an improved Bourdon pressure gauge having an internal trap of relatively large capacity without in any way altering the shape of the post or socket member. The drilling out of the opening 9 in no way detracts from the structural strength of the post or socket member 2 since it is substantially all done within the extended nipple portion 6 and a sufficient wall thickness on this nipple portion can be left in order to insure adequate strength in this portion for supporting the gauge on a steam pipe or other equivalent means leading from a source of liquid under fluid pressure. Yet, at the same time, the wall thickness of the trap chamber can be reduced sufficiently to aid in condensation, as above explained, and which is further augmented by the increased internal condensing surface provided. The trap, since it is entirely enclosed within the post or socket member, does not occupy any of the space within the gauge casing. This is of considerable importance in gauges of the so-called "back-connected type" in which the surrounding casing member is usually just large enough to nicely enclose the circular-shaped Bourdon spring 32, leaving little, if any, room within the casing for an additional tube or trap element, such as is frequently used to provide a siphon or trap as has been previously mentioned in the foregoing part of this specification.

The drilling out of opening 9 or its formation in the casting process is a simple and inexpensive procedure and the provision of the closing plate 41 by means of staking or possibly by threading or soldering at point 42 is likewise a step which involves little labor or added expense.

Accordingly, it will be seen that I have provided an extremely simple type of internal trap which is particularly well adapted for gauges of the "back-connected" type but may also be applied to post or socket members of other types. My improved construction provides a trap of adequate and sufficient volume, located well above the Bourdon spring connection to protect the soldered joint, and designed to insure condensation of the liquid by expansion thereinto through the small opening 11 and by cooling through the nipple wall. My improved trap likewise does not alter the shape or size of the post or socket member to which it is applied and is extremely simple and inexpensive to incorporate in gauges of practically all kinds and descriptions.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A pressure gauge, comprising, a socket member having a body section and a threaded nipple extending laterally from said body section, a Bourdon spring secured to said body at a point below said nipple and including a part extending upwardly above said nipple, said nipple being formed to provide an enlarged chamber, said body being provided with a passage connecting the lower portion of said chamber to said Bourdon spring, and said nipple being provided with a passage leading to the upper portion of said chamber for connecting said chamber to a source of fluid under pressure.

2. A pressure gauge, comprising, a socket member having a body section and a threaded nipple extending therefrom at right angles to said body section, a Bourdon spring secured to said body at a point below said nipple and including a part extending upwardly above said nipple, said nipple being formed to provide an enlarged chamber, said body being provided with a passage connecting the lower portion of said chamber to said Bourdon spring, and said nipple being provided with a passage adjacent the upper portion of said chamber for connecting said chamber to a source of fluid under pressure.

3. A pressure gauge comprising the combination set forth in claim 2, wherein said enlarged chamber has a capacity approximately equal to that of the part of said Bourdon spring which extends above said nipple.

4. A pressure gauge, comprising the combination set forth in claim 2, wherein said passage means in said nipple is of restricted cross-sectional area as compared to that of said chamber, whereby fluid under pressure passing through said passage is caused to expand and condense within said chamber.

5. A pressure gauge, comprising, a socket member having a body section and a threaded nipple extending rearwardly therefrom, said nipple being hollowed out to form a recess extending from the front of said body to a point adjacent the rear of said nipple, means secured to said body for closing said recess at the front of said body, a Bourdon spring secured to said body at a point materially below said recess, said body being provided with a passage connecting said spring and said recess, and said nipple being provided with an inlet passage to the upper portion of said recess.

6. A pressure gauge, comprising, a socket member having a rearwardly extending nipple thereon, a Bourdon spring mounted on said socket at a point below said nipple, said socket member being provided with a bore extending into said nipple to a point adjacent its outer end, said bore being but slightly smaller than the outside diameter of said nipple to thereby provide an enlarged trap chamber, having relatively thin walls formed by said nipple, said body being provided with a passage connecting said chamber to said Bourdon spring, and the outer end of said nipple being provided with a passage adjacent the upper portion of the chamber for connecting said chamber to a source of fluid under pressure.

BERT McCLELLAND.